J. H. RUSBY.
CHUCK.
APPLICATION FILED DEC. 13, 1915.

1,270,443.

Patented June 25, 1918.
3 SHEETS—SHEET 1.

WITNESS:
Rob R Kitchel.

INVENTOR
Joseph H. Rusby
BY
Augustus B Stoughton
ATTORNEY

J. H. RUSBY.
CHUCK.
APPLICATION FILED DEC. 13, 1915.
1,270,443.
Patented June 25, 1918.
3 SHEETS—SHEET 2.
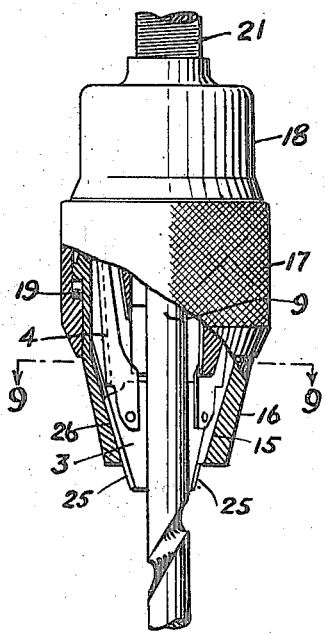
FIG. 7.
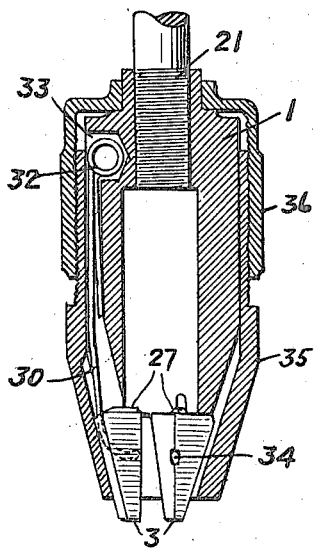
FIG. 10.
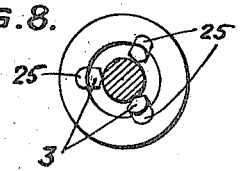
FIG. 8.
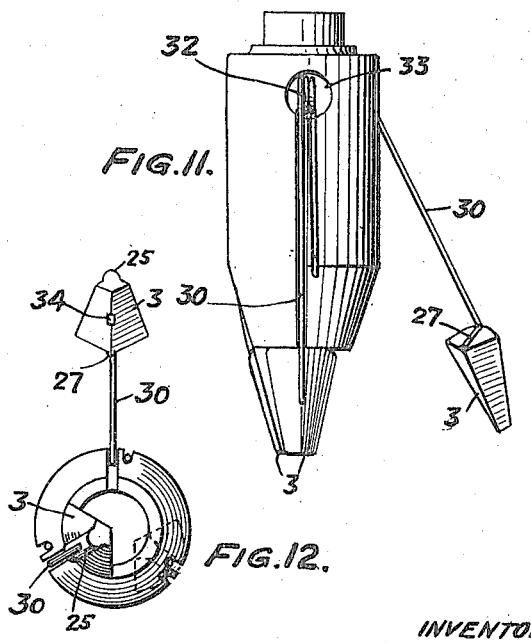
FIG. 11.
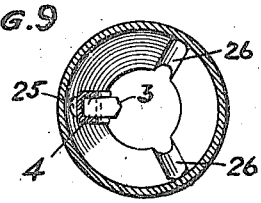
FIG. 9.
FIG. 12.
WITNESS:
Rob't P. Kitchel.
INVENTOR
Joseph H. Rusby
BY
Augustus B. Stoughton
ATTORNEY.

J. H. RUSBY.
CHUCK.
APPLICATION FILED DEC. 13, 1915.

1,270,443.

Patented June 25, 1918.
3 SHEETS—SHEET 3.

WITNESS:
Rob R Kitchel.

INVENTOR
Joseph H. Rusby
BY
Augustus B. Stoughton.
ATTORNEY.

UNITED STATES PATENT OFFICE.

JOSEPH H. RUSBY, OF NUTLEY, NEW JERSEY.

CHUCK.

1,270,443.	Specification of Letters Patent.	Patented June 25, 1918.

Application filed December 13, 1915. Serial No. 66,408.

*To all whom it may concern:*

Be it known that I, JOSEPH H. RUSBY, a citizen of the United States, and a resident of Nutley, in the county of Essex and State of New Jersey, have invented certain new and useful Improvements in Chucks, of which the following is a specification.

The principal object of the present invention is to provide a chuck that will accommodate square-head or straight-shank tools of various sizes; that will hold them true of alinement and will hold them practically proof against slipping in forward or backward operation, and this by hand tightening and without the use of a wrench. Another object of the invention is to secure a simple, reliable and cheap chuck, which may be constructed largely of sheet stock and punchings. Another object of the invention is to insure line gripping contact with the shank of the tool and to provide for parallelism of motion of the working edges or lines of the gripping jaws. Other objects of the invention will appear from the following description.

The foregoing objects are accomplished according to my invention, as will be readily understood from the following description in connection with which reference will be made to the accompanying drawings illustrating selected embodiments of the invention and in which—

Fig. 7, is a side view, partly in section, of a chuck embodying a modification of the invention.

Fig. 8, is an end view, partly in section, of the device shown in Fig. 7, looking upward.

Fig. 9, is a section on the line 9—9 of Fig. 7.

Fig. 10, is a sectional view illustrating a chuck embodying another modification of the invention.

Fig. 11, is a side elevational view of the chuck shown in Fig. 10 with the shell removed.

Fig. 12, is an end view, looking upward, of the device shown in Fig. 11.

Figure 3:
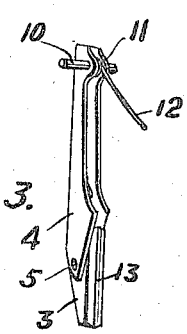
Fig. 3, is a detail perspective view of one of the tool gripping jaws and supporting post.
Figure 4:
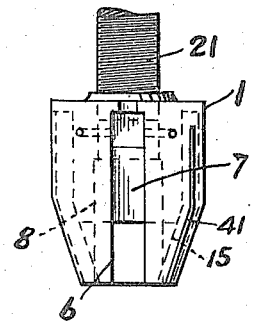
Fig. 4, is an elevational view of the supporting base.
Figure 6:
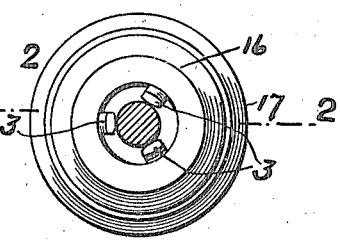
Fig. 6, is an end view, looking upward, of the tool shown in Fig. 1.
Figure 5:
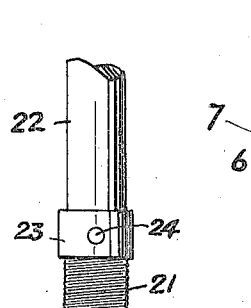
Fig. 5, is a plan view, looking upward, of the supporting base.
Figure 1:
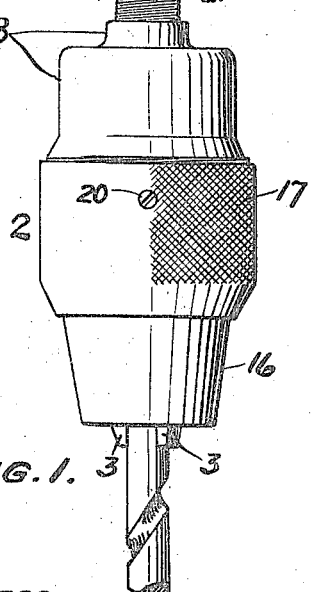
Figure 1, is an elevation of a chuck embodying features of the invention.
Figure 2:
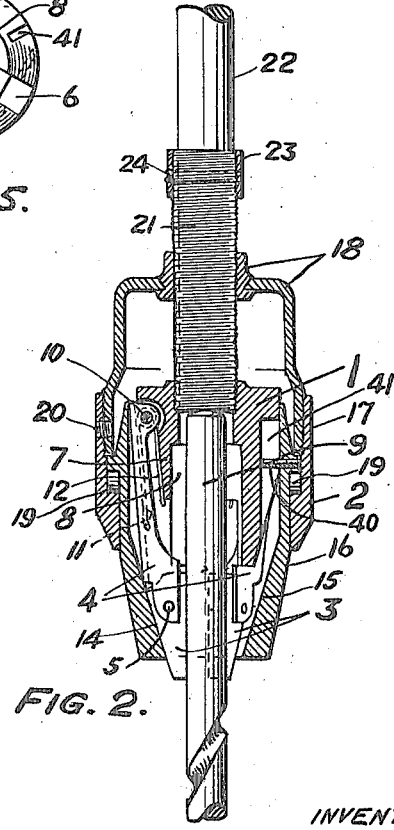
Fig. 2, is a sectional view taken on the line 2—2 of Fig. 6.

Referring to Figs. 1 to 6, 1 is the supporting base, 2 designates as a whole an inclosing shell movable on the base. 3 are tool gripping jaws operated by the shell. 4 are supporting posts for the jaws and they are operatively connected with the base and are pivotally connected with the jaws as by means of pivots 5. The supporting base is provided with notches 6 that receive the jaws. These notches do not extend through the body of the base but leave a continuous wall 7 which incloses a chamber 8 and lies between the shank 9 of the tool and the parts of the post 4, remote from the jaws 3. The posts 4 are pivoted within the slots 6 by means of pins 10. The posts are of generally U-shaped section and are therefore both light and strong and the jaws 3 can be conveniently arranged between their webs, as are also one of the ends of each of the spiral springs 11 which encircle the pins 10, and have their other ends 12 in contact with the base. The described construction is strong so that the posts 4 may be relied upon to take the end thrust on the jaws. The articulation or pivot between the post and the jaws insures parallelism of the working edges 13 of the jaws in all positions thereof. The working edges 13 are beveled so that they come to a line, thus affording a line contact between the jaws and the shank of the tool. The tool is wholly gripped, held and supported by the jaws, and the end of the shank of the tool is in the chamber 8 and need not contact with any of the walls thereof. The rear faces 14 of the jaws are inclined and coöperate with the inclined or conical face 15 of the inclosing shell. The inclosing shell consists of several sections. The sections 16 and 17 have interposed between them a circular row of rollers 19 that run on races formed on the parts. These rollers have their axes of rotation at right angles to the principal axis of the tool and they, of course, have line contact with their races. Such rollers, since they have line contact with their races, may be comparatively thin and yet will be sufficiently strong, and there is another advantage in the use of these rollers which is that their races need not be hardened but since the rollers are thin the diameter of the tool as a whole may be kept within desirably small limits. The section 18 of the shell is shown as consisting of two parts, firmly and permanently connected together, and of which one is connected to the section 17 by means of narrow threads and a set screw 20, and of which the other is connected with a sleeve 21 by screw threads. The sleeve 21 is mounted on the spindle 22, there being a reinforcing ring 23 at the point where the pin 24 secures the spindle and sleeve, so as to cause them to rotate as one piece. The sleeve 21 is also permanently or rigidly attached to the base 1. The section 17 may be milled on the outside to afford a firm grip and when it is turned the section 16 of the shell is moved by reason of the thread on sleeve 21 in the direction of the length of the spindle 22, thus closing the jaws or permitting them to open under the action of their springs. The rollers afford freedom of motion so that power is not lost in undue friction.

Instead of relying upon the post to take all of the thrust on the jaw, the jaw may be provided with a rib 25, Figs. 7 to 9, sliding in a corresponding groove 26 in the shell and in addition the jaw may be provided with a rib 27, Fig. 11, working in the end of the notch in the base. Furthermore the post may be relieved of end thrust of the jaw in one direction by permitting the jaw to seat on the end 28 of the head, Fig. 13. This can be accomplished by providing a slight lost motion in the pivot 29 in that figure. Another way to do this is to employ a post 30, Fig. 11, or 31, Fig. 16, as of piano wire which can be arranged to spring sufficiently to permit the jaw to seat on the end of the base.

Referring to Figs. 10 to 12, the piano wire is coiled as at 32 and the groove 33 in the base is modified to accommodate it. The jaw is pivoted to the end of the post 30 in such a way that there is lost motion. In other words the rivet 34 is not tight. In the structure of all of the figures, except Figs. 16 and 17, the post is hinged, pivoted or articulated at one end to the base and at the other end to the jaw.

Figure 16:
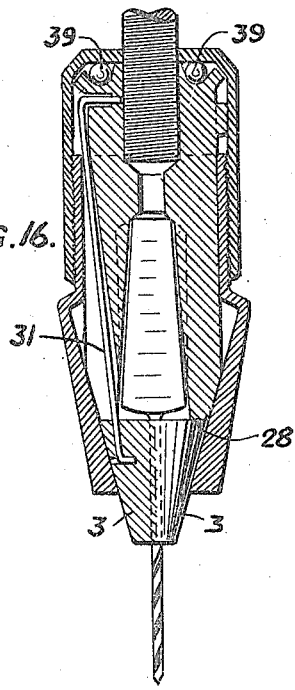
Figs. 16 and 17, are sectional views illustrating another modification and showing a square shank tool and a cylindrical shank tool.
Figure 14:
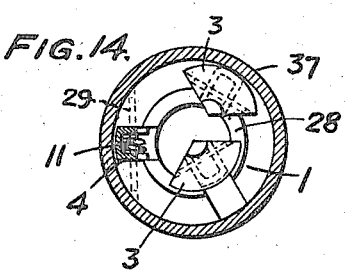
Fig. 14, is a sectional view, taken on the line 14—14 of Fig. 13.
Figure 15:
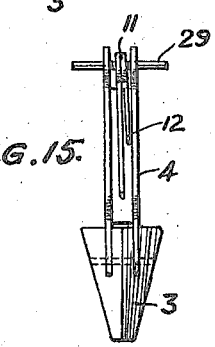
Fig. 15, is a detached view of one of the jaws shown in Fig. 13.
Figure 17:
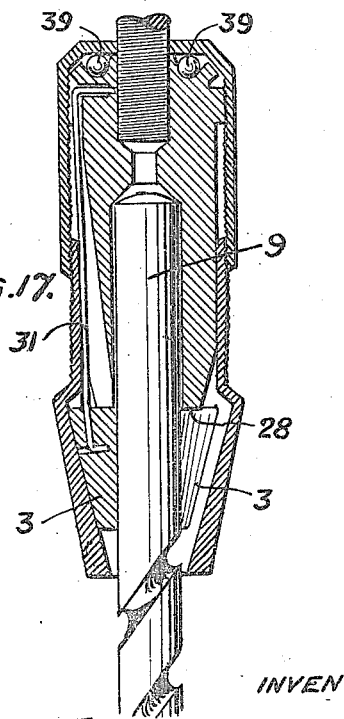

In Figs. 16 and 17 the connection between the ends of the post 31 and the base and jaw is rigid, but since the post is of piano wire or its equivalent it is sufficiently flexible in itself to provide the necessary hinge, pivot or articulation.

Figure 13:
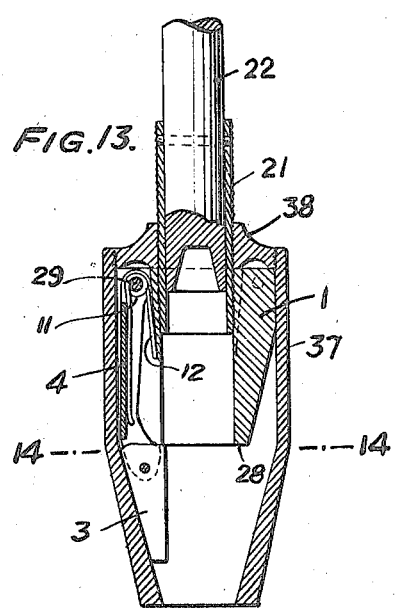
Fig. 13, is a sectional view of a chuck embodying features of the invention with parts removed.

In Fig. 10 the shell consists of two sections 35 and 36 and the anti-friction rollers are omitted. As shown in Fig. 13 the shell consists of two pieces 37 and 38 and as shown in Figs. 16 and 17 the shell consists of two pieces and anti-friction balls 39 are provided between the ends of the shell and the base. In Figs. 16 and 17, the spindle and the part of the shell mounted upon it are relatively immovable, although they are shown as connected by a thread.

The cap piece 16 can be splined as by means of the pin 40 and groove 41 to the base 1 and when that is done the base assists in revolving the cap 16. The cap 16, if provided with groove seats as 26, assists in driving the jaws. The small base stem 21 and relatively large shell diameter to which the gripping power of the hand is applied are important, for in this way the power of the hand is advantageously applied to tightening the jaws.

In Figs. 1 to 9, and Figs. 13 to 17, the jaws are like those shown in Fig. 3, and they have tool gripping edges and half-round backs. The jaws shown in Figs. 10 to 12 are substantially the same, but are provided on the back with a rib 25, and with a radially disposed rib 27.

It will be obvious to those skilled in the art to which the present invention relates that modifications may be made in details of construction and arrangement without departing from the spirit of the invention, hence the latter is not limited to those matters or in any way further than the appended claims and the prior state of the art may require.

What I claim is:

1. A chuck comprising a spindle, a base fixed in respect to the spindle, an inclosing shell longitudinally movable on the base, tool gripping jaws operatively supported on the base for rotation in unison with the base and spindle, and longitudinal complemental grooves and ribs between the shell and jaws which permit of relative sliding motion.

2. A chuck comprising the combination of a spindle, a base fixed in respect to the spindle, an inclosing shell longitudinally movable on the base, jaw supporting posts operatively supported on the base, tool gripping jaws operatively supported on the posts, and longitudinal complemental grooves and ribs between the shell and jaws which permit of relative sliding motion.

3. In a chuck the combination of a spindle, a supporting base fixed in respect to the spindle, an inclosing shell consisting of sections relatively turnable and whereof one is provided with longitudinal grooves and movable lengthwise on the base, tool gripping jaws slidably seated in said grooves, and supporting posts for the jaws and said jaws pivotally connected with said supporting posts and said supporting posts operatively connected with said base, and the other shell section having a screw and thread connection with the spindle.

4. A chuck comprising a base, an inclosing shell consisting of two sections relatively turnable and of which one is longitudinally movable on the base, jaw supporting posts operatively supported on the base, tool gripping jaws supported on the posts, and longitudinal complemental grooves and ribs between the sleeve and grooves which permit of relative sliding motion, and spring means operatively connecting said posts and said base.

5. In a chuck the combination of a supporting base, an inclosing shell consisting of sections relatively turnable and of which one is provided with longitudinal grooves and movable lengthwise on the base, tool gripping jaws slidably seated on said grooves, and spring supporting posts for the jaws, said jaws pivotally connected with said supporting posts and said supporting posts operatively connected with said base.

6. A chuck comprising a base, an inclosing shell consisting of sections relatively turnable and of which one is longitudinally movable on the base, tool gripping jaws operatively supported on the base, longitudinal grooves in said shell, said jaws slidably seated in said grooves, and spring means operatively connecting said jaws and said base.

7. A chuck comprising the combination of a supporting base having longitudinal slots, an inclosing shell consisting of two sections relatively turnable and of which one has longitudinal grooves, tool gripping jaws arranged in said grooves, and supporting posts arranged in said slots and connected with and movable in respect to both the jaws and the base.

8. A chuck comprising a base having a threaded spindle of smaller diameter than the base, tool gripping jaws operatively supported on said base, and a shell separate from the base and inclosing said jaws and said base, said shell formed in sections relatively rotatable on each other, and one of said sections having a portion of reduced diameter operatively supported on said spindle.

9. A chuck comprising a base having a threaded spindle of smaller diameter than the base, jaw posts operatively supported on the base, tool gripping jaws supported on the posts, and a shell inclosing said jaws, said posts, and said base, said shell formed in sections relatively rotatable on each other, one of said sections having a portion of reduced diameter operatively supported on said stem.

10. In a chuck the combination of a supporting base, an inclosing shell movable on the base, tool gripping jaws adapted to be closed by the shell, channeled-supporting posts for the jaws, pivot pins for connecting the base and posts, springs coiled about said pins and having one of their ends arranged in the channel of the post and the other of their ends in contact with the base.

11. In a chuck the combination of a supporting base, an inclosing shell, tool gripping jaws adapted to be closed by the shell, channeled-supporting posts movably connected with the base, pins bridging the channel portion of the posts, and springs coiled on said posts and having one of their ends in the channel portion of the posts and the other of their ends in contact with the base.

12. In a chuck the combination of a shell, jaws having line contact working edges and arranged within the shell, supporting posts for the jaws, and a base having an annular wall extending inside of the posts and facially notched for their reception and providing a tool chamber commensurate in depth with the length of the posts.

13. A chuck comprising a threaded spindle, a base rotatably fixed on and larger than the spindle, jaw-supporting posts operatively connected on said base, tool gripping jaws operatively supported on said posts beyond the base, spring means operatively connecting said base and said posts, and an inclosing shell threaded on the spindle and having a hand hold of greater diameter than the spindle and adapted to operate said jaws, substantially as described.

14. A chuck comprising a base having radially arranged grooves on its end, an inclosing shell longitudinally movable on the base, tool gripping jaws operatively supported on the base, longitudinal grooves in said inclosing shell, said jaws formed with a circumferentially curved body and having longitudinally and radially extending ribs adapted to be slidably seated in said grooves.

15. A chuck comprising a base, an inclosing shell extending beyond the base, jaws at the end of the base and in contact with the shell, and jaw supporting posts carried by the base and provided with longitudinally divided ends between which the jaws are pivoted.

16. A chuck comprising the combination of an externally threaded spindle, jaws rotable in unison with the spindle, an enlarged jaw inclosing shell section rotatable in unison with the jaws and spindle and provided with a jaw guiding surface, and a second shell section freely rotatable relatively to the first mentioned shell section and to the jaws and spindle and having an internally threaded and contracted neck coöperating with the spindle thread.

JOSEPH H. RUSBY.

Copies of this patent may be obtained for five cents each, by addressing the "Commissioner of Patents, Washington, D. C."